United States Patent
Adams

(10) Patent No.: US 7,977,599 B2
(45) Date of Patent: Jul. 12, 2011

(54) EROSION RESISTANT TORCH

(75) Inventor: Robbie J. Adams, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 418 days.

(21) Appl. No.: 11/947,252

(22) Filed: Nov. 29, 2007

(65) Prior Publication Data

US 2009/0101629 A1    Apr. 23, 2009

Related U.S. Application Data

(60) Provisional application No. 60/981,305, filed on Oct. 19, 2007.

(51) Int. Cl.
*B23K 10/00* (2006.01)

(52) U.S. Cl. .......... 219/121.48; 219/121.5; 219/121.52; 219/75; 219/121.59; 313/231.41

(58) Field of Classification Search ............ 219/121.39, 219/121.45, 121.54, 121.5, 121.51, 121.52, 219/75, 121.48; 313/231.41
See application file for complete search history.

(56) References Cited

U.S. PATENT DOCUMENTS

| | | | |
|---|---|---|---|
| 497,903 A | 5/1893 | Woodward | |
| 2,819,423 A * | 1/1958 | Clark ....................... | 313/231.51 |
| 3,226,768 A | 1/1966 | von Zelewsky et al. | |
| 3,578,943 A * | 5/1971 | Schoumaker ............ | 219/121.47 |
| 3,618,925 A | 11/1971 | Giroiami | |
| 3,854,635 A | 12/1974 | Tschinkel | |
| 4,094,492 A | 6/1978 | Beeman et al. | |
| 4,450,341 A | 5/1984 | Dietrick et al. | |
| 4,911,805 A | 3/1990 | Ando et al. | |
| 4,947,024 A | 8/1990 | Anderson | |
| 5,105,732 A | 4/1992 | Sheu | |
| 5,209,388 A | 5/1993 | Mittendorf et al. | |
| 5,382,003 A | 1/1995 | Sankaranarayanan et al. | |
| 5,486,671 A * | 1/1996 | Miyata et al. .............. | 219/76.14 |
| 5,494,122 A | 2/1996 | Larson et al. | |
| 5,539,176 A * | 7/1996 | Ikegaya et al. ........... | 219/121.59 |
| 5,928,799 A | 7/1999 | Sherman et al. | |
| 5,975,493 A | 11/1999 | Ellingson et al. | |
| 6,051,070 A | 4/2000 | Sunter | |
| 6,118,097 A | 9/2000 | Kaga et al. | |
| 6,325,096 B1 | 12/2001 | Rising et al. | |
| 6,358,466 B1 | 3/2002 | Besser et al. | |
| 6,479,175 B1 | 11/2002 | Holler et al. | |
| 6,680,456 B2 * | 1/2004 | Adams ..................... | 219/121.47 |
| 6,814,925 B1 | 11/2004 | Jimenez | |
| 6,963,045 B2 | 11/2005 | Zapletal et al. | |
| 7,005,599 B2 | 2/2006 | Faslivi et al. | |
| 7,041,384 B2 | 5/2006 | Mittendorf | |
| 7,598,473 B2 * | 10/2009 | Cook et al. ................. | 219/121.5 |
| 7,605,340 B2 * | 10/2009 | Duan ....................... | 219/121.51 |
| 2007/0090168 A1 * | 4/2007 | Snow et al. ................. | 228/101 |

* cited by examiner

*Primary Examiner* — Mark H Paschall
(74) *Attorney, Agent, or Firm* — Ingrassia Fisher & Lorenz, P.C.

(57) ABSTRACT

An erosion resistant torch for use in a solid free form fabrication system for manufacturing a component from successive layers of metal feedstock material. The erosion resistant torch includes a torch structure defining a torch nozzle formed of a highly conductive bulk material. The erosion resistant torch further includes a gas flow channel and an orifice defined therein. An arc electrode is disposed within the gas flow channel. An erosion resistant material is disposed between the torch nozzle and the arc electrode in the form of a coating layer or an erosion resistant insert. The erosion resistant material is formed of one of a refractory material or a ceramic material.

8 Claims, 3 Drawing Sheets

EROSION RESISTANT TORCH

CROSS-REFERENCE TO RELATED APPLICATION

This application claims the benefit of U.S. Provisional Application No. 60/981,305 filed Oct. 19, 2007.

TECHNICAL FIELD

The present invention generally relates to the fabrication of parts and devices, and more particularly relates to an erosion resistant torch used in solid free-form fabrication processes that create parts and devices by selectively applying feedstock material to a substrate or an in-process workpiece.

BACKGROUND

Solid free-form fabrication (SFF) is a designation for a group of processes that produce three dimensional shapes from additive formation steps. Most SFF processes are also referred to as layer additive manufacturing processes. SFF does not implement any part-specific tooling. Instead, a three dimensional component is often produced from a graphical representation devised using computer-aided modeling (CAM). This computer representation may be, for example, a layer-by-layer slicing of the component shape into consecutive two dimensional layers, which can then be fed to control equipment to fabricate the part. Alternatively, the manufacturing process may be user controlled instead of computer controlled. Generally speaking, a component may be manufactured using SFF by successively building feedstock layers representing successive cross-sectional component slices. Although there are numerous SFF systems that use different components and feedstock materials to build a component, SFF systems can be broadly described as having an automated platform/positioner for receiving and supporting the feedstock layers during the manufacturing process, a feedstock supplying apparatus that directs the feedstock material to a predetermined region to build the feedstock layers, and an energy source directed toward the predetermined region by a torch. The energy from the energy source modifies the feedstock in a layer-by-layer fashion in the predetermined region to thereby manufacture the component as the successive layers are built onto each other.

One recent implementation of SFF is generally referred to as ion fusion formation (IFF). With IFF, a torch such as a plasma, gas tungsten arc, plasma arc welding, or other torch with a variable orifice, in conjunction with a stock feeding mechanism to direct molten feedstock to a targeted surface such as a base substrate or an in-process structure of previously-deposited feedstock. A component is built using IFF by applying small amounts of molten material only where needed in a plurality of deposition steps. The result is a net-shape or near-net-shape part without the use of patterns, molds, or mandrels. The deposition steps are typically, but not always performed in a layer-by-layer fashion wherein slices are taken through a three dimensional electronic model by a computer program. Hence in most deposition applications it would be considered a layer additive manufacturing process. A positioner then directs the molten feedstock across each layer at a prescribed thickness.

There are also several other SFF process that may be used to manufacture a component. SFF processes can be sub divided into subcategories, two of which are direct metal deposition (DMD) and selective laser sintering (SLS). DMD is a process whereby metal is melted then placed where needed to build a three-dimensional part. SLS on the other hand spreads a layer of powder on a table then selectively fuses the appropriate portion to build a three-dimensional component. One of the challenges facing SFF processes, and more particularly ion fusion formation (IFF) processes and direct metal deposition (DMD) processes is that of achieving a sufficiently high deposition rate, so that the cost of the component being fabricated is reduced. In order to achieve higher deposition rates, high heat is required. This applies to all IFF and DMD systems but particularly to gaseous systems, such as arc based systems. These types of gaseous systems inherently tend to be more energy diffuse than laser or electron beam systems due to the basic mechanism of heat transfer, and more particularly the impingement of very high temperature gas flow onto a work piece. One inherent limitation of this type of system is the torch gas concentration mechanism, also referred to as the torch nozzle, and the velocity of the gas through the orifice of the torch nozzle.

A conflict exists between the need for high heat and accompanying high deposition rates and the life of the torch gas concentration mechanism, and more particularly the torch nozzle. In general, high heat is generated by an increase in gas flow. This increase in gas flow may be achieved by increasing the velocity or using a torch nozzle having a large orifice. An increase in the velocity of the gas moving through the orifice of the torch nozzle typically results in erosion of the nozzle. In addition, with an increase in the nozzle size, and more particularly the orifice diameter, the energy density is reduced and the deposition becomes coarser, and complicates the need for deposition accuracy. Accordingly, while one criterion for increased deposition rate can be achieved by flowing more gas through a larger nozzle, hence more heat, a larger nozzle creates a larger, less accurate deposit. The closer the solidified deposition is to final dimensions the less machining is needed and the lower the cost of the final fabricated product.

To deliver high heat with higher deposition accuracy, the orifice of the torch nozzle must be small, yet allow large amounts of heat to pass through. With a gaseous system to carry the increased heat, erosion of the nozzle orifice will occur. To prolong the life of the torch nozzle, the orifice must be kept cool and resistant to heat. Current DMD torch nozzles include copper as the most common nozzle material due to its ability to be kept cool. However, the copper/gas interface is susceptible to erosion due to the high heat. Copper has a low melting temperature compared to refractory metals and ceramics. Conversely, while refractory metals and ceramics are resistant to heat, most do not conduct heat as well as copper nor are they necessarily resistant to arc erosion.

In addition to SFF, joining of two components using conventional plasma torches and nozzles creates relatively large fusion zones compared to other fusion joining processes such as electron beam or laser welding. A narrower erosion resistant orifice could reduce the fusion zone width (diameter) of the plasma weld and possibly increase penetration of the weld. The latter would result from a higher energy density at the plasma spot in the joint.

Hence, there is a need for an erosion resistant torch for use in high heat applications, such as solid free-form applications, including a direct metal deposition system that includes a torch nozzle having an orifice that is resistant to high heat, thereby minimizing nozzle erosion and increasing the life of the torch.

BRIEF SUMMARY

The invention described in this disclosure supports the creation of an erosion resistant torch and more particularly an improved orifice of the torch that is resistant to high heat typically used during solid free-form fabrication (SFF) systems, such as direct metal deposition (DMD) systems.

In one particular embodiment, and by way of example only, there is provided an erosion resistant torch for use in a solid free form fabrication system for manufacturing a component from successive layers of metal feedstock material. The erosion resistant torch includes a torch structure, an arc electrode and an erosion resistant material. The torch structure includes a torch nozzle comprised of a bulk material and having a gas flow channel and an orifice defined therein. The arc electrode is disposed within the gas flow channel formed in the torch nozzle. The erosion resistant material disposed between the torch nozzle and the arc electrode.

In yet another embodiment, and by way of example only, there is provided an erosion resistant torch including a torch structure, an arc electrode, an erosion resistant material and a bonding material. The torch structure includes a torch nozzle comprised of a bulk material and having a gas flow channel and an orifice defined therein. The arc electrode is disposed within the gas flow channel formed in the torch nozzle. The erosion resistant material is disposed between the torch nozzle and the arc electrode. The bonding material is disposed between the erosion resistant material and the torch nozzle to bond the erosion resistant material to the torch nozzle.

In yet another embodiment, and by way of example only, there is provided a solid free form fabrication system for manufacturing a component from successive layers of a metal feedstock material. The system includes an erosion resistant torch, a feedstock feed mechanism, a positioning arm and a control platform. The erosion resistant torch is positioned to emit an energy stream in an energy path. The feedstock feed mechanism is operable to feed the metal feedstock material into the energy path and deposit the metal feedstock material into a predetermined region to form the successive layers of the metal feedstock material. The positioning arm is coupled to the energy stream and the feedstock feed mechanism to form a deposition head. The positioning arm is positionable to align the deposition head with a targeted region to fabricate a three-dimensional structure by transferring the metal feedstock material from the feedstock feed mechanism to the targeted region in a controlled manner by melting the metal feedstock material at a deposition point and allowing it to re-solidify at the targeted region. The control platform is coupled to the positioning arm. The control platform includes a plurality of control components, whereby a plurality of customizable control parameters are input into the plurality of control components and provide positioning and repositioning of the positioning arm and operation of the deposition head. The erosion resistant torch includes a torch structure, an arc electrode, and an erosion resistant material. The torch structure includes a torch nozzle comprised of a bulk material and having a gas flow channel and an orifice defined therein. The arc electrode is disposed within the gas flow channel formed in the torch nozzle. The erosion resistant material is disposed between the torch nozzle and the arc electrode, the erosion resistant material formed of at least one of a refractory material or a ceramic material.

DETAILED DESCRIPTION OF A PREFERRED EMBODIMENT

The following description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
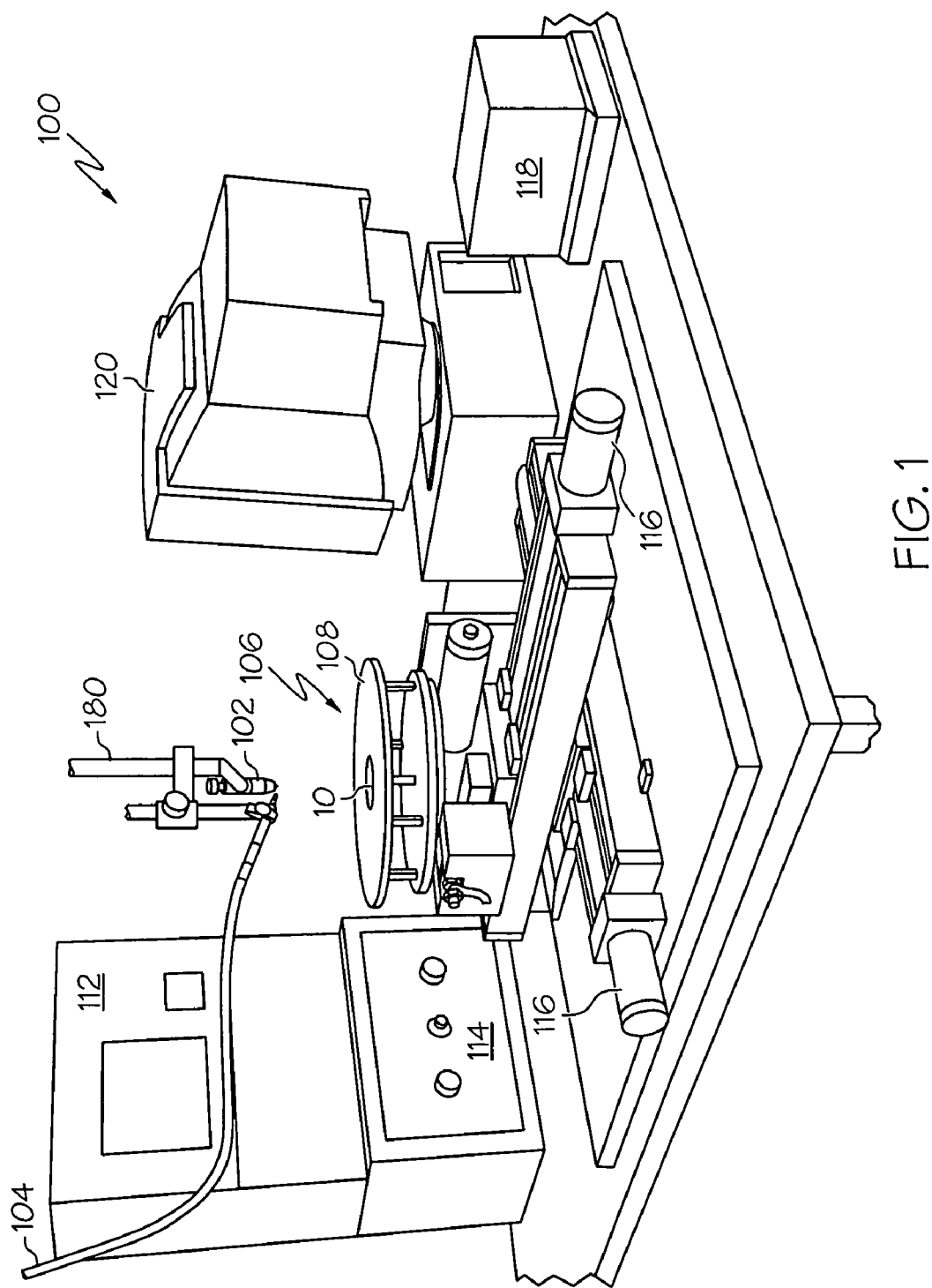
FIG. 1 is a perspective view of an IFF system according to an embodiment of the invention.

Disclosed is an IFF system including an erosion resistant, and more particularly an orifice of a torch nozzle that is capable of withstanding high heat, while maintaining heat conductivity, with minimal material erosion. Referring to the illustrations, FIG. 1 is a perspective view of an IFF system 100, which includes an erosion resistant torch 102 that functions in cooperation with a wire feed mechanism 104 and a positioning system 106 to build up a workpiece in a continuous or layer-by-layer manner. The positioning system 106 continuously positions and repositions a platform 108, and more particularly a workpiece 110 built upon the platform 108 in a manner whereby feedstock material may be added to the workpiece 110 through the wire feed mechanism 104 at predetermined deposition points. Further, the positioning system 106 may also be configured to coordinate movement and control of the erosion resistant torch 102 and the wire feed mechanism 104 together with the workpiece 110 to fabricate three-dimensional articles in a predictable, highly selectable, and useful manner. Control of the positioning system 106 may be achieved by computer-implemented control software or the like. The coordinated erosion resistant torch 102, wire feed mechanism 104, and positioning system 106 provide a highly flexible, manually adaptable, and spontaneously constructible automated system through which components may be fabricated to net or near-net shape.

Additional elements depicted in FIG. 1 include a gas controller 112 that controls gas and/or fluid flow to the erosion resistant torch 102, which is preferably a plasma welding torch. A plasma or arc power source 114 supplies the necessary power to the erosion resistant torch 102. Positioners and/or positioning motors 116 are supplied with positioning signals from an electric drive 118 that is coupled to a computer 120 or other controlling device.

Figure 2:
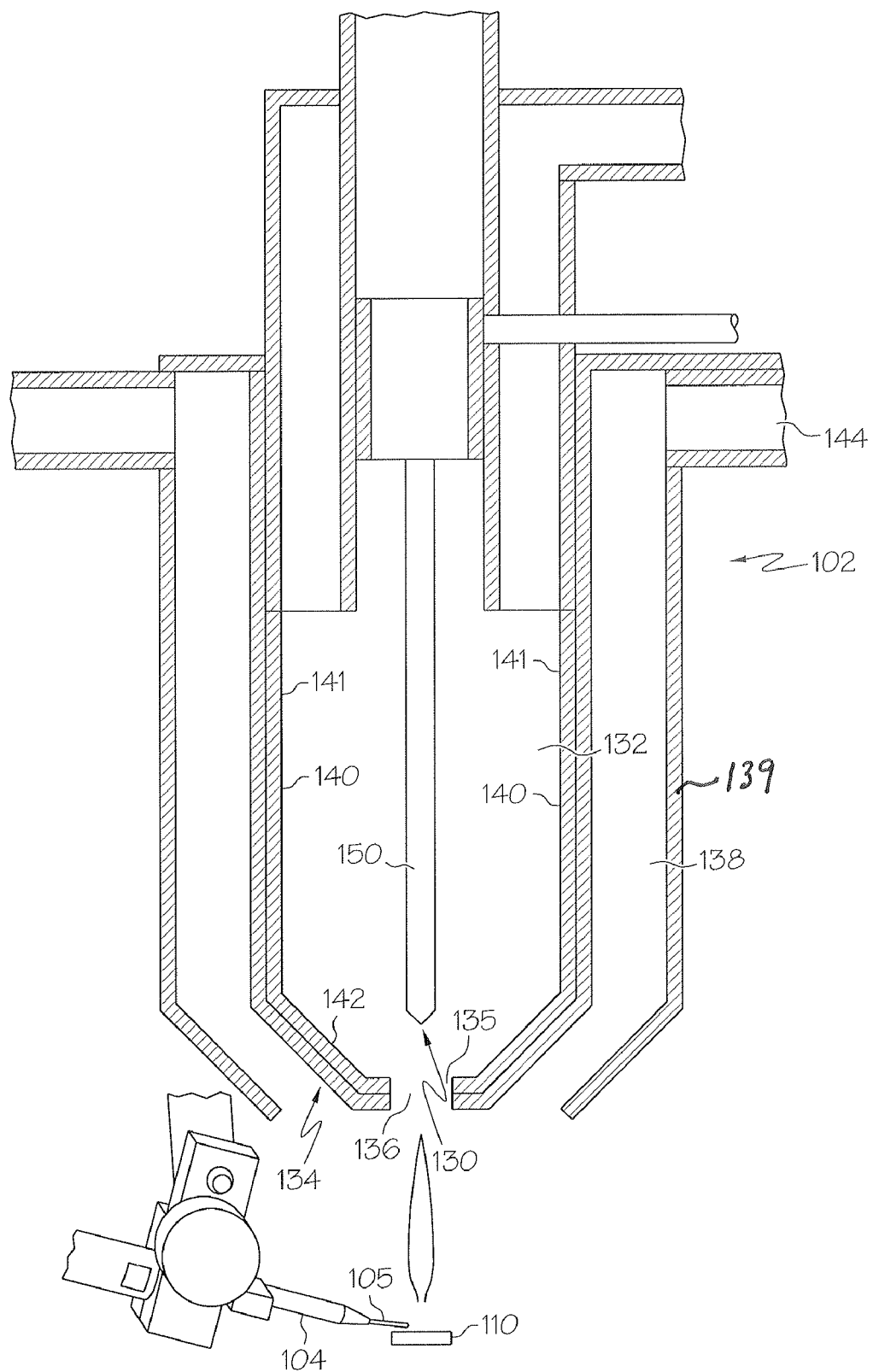
FIG. 2 is a cross-sectional view of an erosion resistant torch from an IFF system, the erosion resistant torch functioning in cooperation with a wire feed mechanism, which is depicted in a perspective view.
Figure 3:
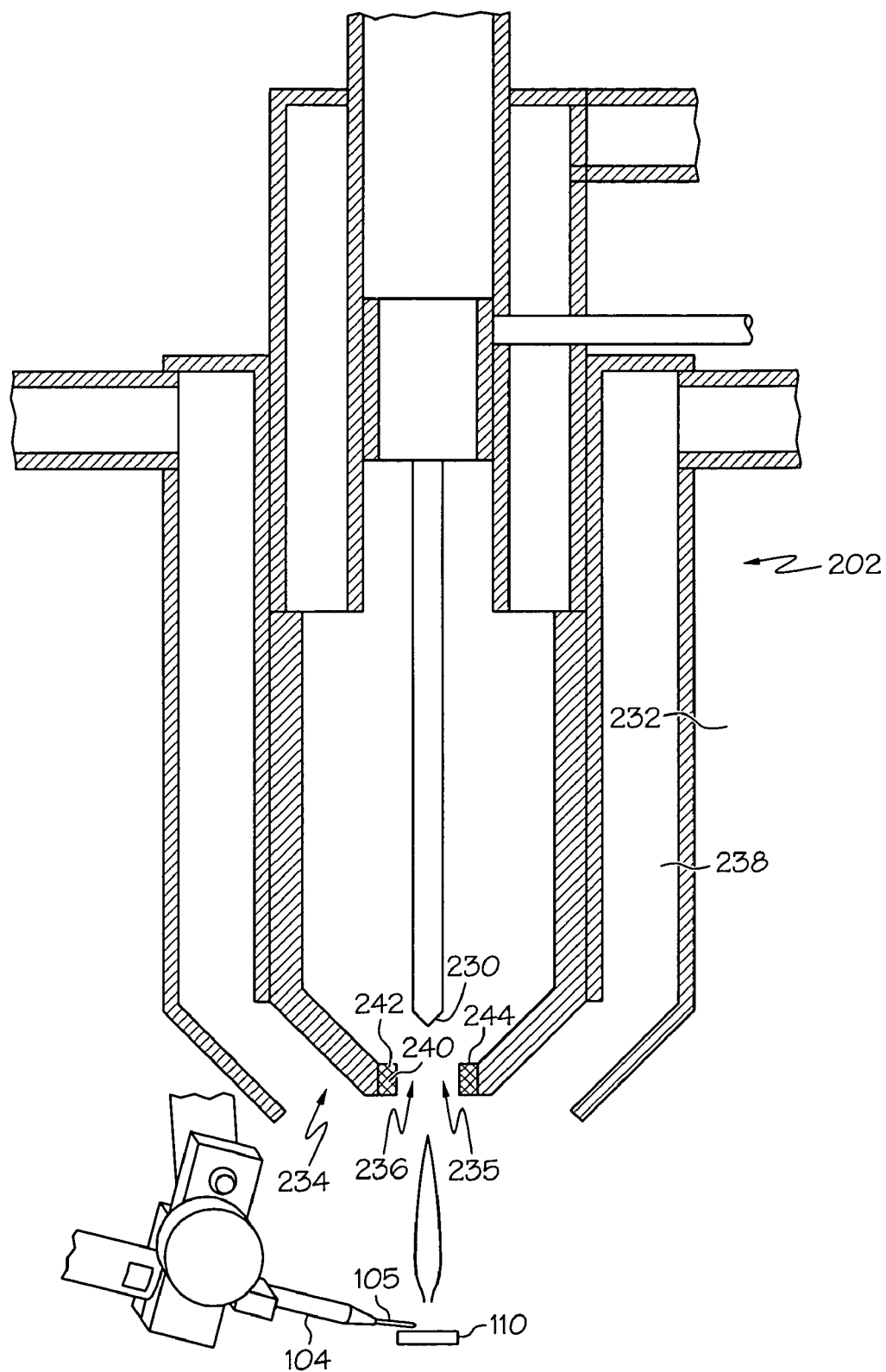
FIG. 3 is a cross-sectional view of another embodiment of an erosion resistant torch from an IFF system; the erosion resistant torch functioning in cooperation with a wire feed mechanism, which is depicted in a perspective view.

A cross-sectional view of the erosion resistant torch 102 is depicted in detail in FIGS. 2-4, illustrating various embodiments of the erosion resistant torch 102 in cooperation with a wire feed mechanism 104. Referring more specifically to FIG. 2, the erosion resistant torch 102 includes a torch nozzle 134 formed at a proximate end and having an orifice 135 formed therein the torch nozzle 132. An arc electrode 130 is positioned near the torch nozzle 134 and inside a gas flow channel 132. The arc electrode 130 operates to ionize a gas and create a hot argon plasma in region 136 before the gas exits the torch nozzle 134. Upon being energized, the argon gas rapidly accelerates from the torch nozzle 134 toward the workpiece 110 via the orifice 135. The wire feed mechanism 104 introduces a feedstock 105 between the torch nozzle 134 and the workpiece 110. In an exemplary embodiment, the workpiece 110 is included in an electrical circuit including the ionized gas in order to accelerate and attract the ions from the torch nozzle 134. The workpiece may be charged by applying a voltage that is opposite of the charge generally present in the ionized plasma gas. The ionized gas is then electrically attracted to the workpiece 110. Use of such electrical charge in the workpiece 110 may also serve to control the direction and distribution of the ionized plasma gas. The degree of attraction between the ions and the workpiece 110 may be controlled by increasing or decreasing the charge present on the workpiece 110.

A noble gas such as argon is preferably ionized using the arc electrode 130, although alternative inert gases, ions, molecules, or atoms may be used in conjunction with the erosion resistant torch 102 instead of argon. These alternative mediators of the plasma energy may include positive and/or negative ions or electrons alone or together with ions. Further, reactive elements may be combined with an inert gas such as argon to optimize performance of the erosion resistant torch 102. The plasma generating process energizes the argon gas so that the gas temperature is raised to between 5,000 and 30,000K. Consequently, only a small volume of energized argon gas is required to melt feedstock 105 from the wire feed mechanism 104. Nozzles of varying apertures or other orifices may be used to provide specific geometry and plasma collimation for the fabrication of different components. Direct beam nozzle orifices may contrast with nozzles having a fan shape or other shapes.

The ionized argon plasma, and all other ionized noble gases, have strong affinity for electrons and will obtain them from the surrounding atmosphere unless the atmosphere consists of gases having equal or higher electron affinity. One advantage of the exemplary IFF system depicted in the drawings does not require a pressurization chamber or other chamber in which the ambient gas is controlled. However, to prevent the ionized argon plasma from obtaining electrons and/or ions from the surrounding atmosphere, i.e. from nitrogen and oxygen typically present in ambient environments, the ionized argon plasma may be sheathed or protected by a curtain of helium, another noble gas, or other inert gases flowing from the torch nozzle 134 from a coaxial channel 138 that is defined between an outer wall 139 and an exterior surface of the torch nozzle. Helium and other noble gases hold their electrons with a high degree of affinity, and are less susceptible than oxygen or nitrogen to having its electrons taken by the ionized argon plasma. In the depicted embodiment, a gas flow line 144 leads into the coaxial channel 138.

Any material susceptible to melting by an argon ion or other plasma beam may be supplied using a powder feed mechanism or the wire feed mechanism 104 as the metal feedstock 105. Such materials may include steel alloys, aluminum alloys, titanium alloys, nickel alloys, although numerous other materials may be used as the metal feedstock 105 depending on the desired material characteristics such as fatigue initiation, crack propagation, post-welding toughness and strength, and corrosion resistance at both welding temperatures and those temperatures at which the component will be used. Specific operating parameters including plasma temperatures, build materials, melt pool parameters, nozzle angles and tip configurations, inert shielding gases, dopants, and nozzle coolants may be tailored to fit an IFF process. U.S. Pat. No. 6,680,456 discloses an IFF system and various operating parameters, and is hereby incorporated herein by reference.

As previously stated gaseous systems, such as the IFF system 100, is inherently energy diffuse due to the basic mechanism of heat transfer, and more particularly the impingement of very high temperature gas flow onto the work piece 110. During operation, the velocity of the gas through the torch nozzle 134, and more particularly the orifice 135 of the torch nozzle 134 provides for an increase or decrease of the heat generated, whereby high heat is generated by an increase in gas flow.

To deliver high heat with high deposition accuracy, the orifice 135 of the torch nozzle 134 must be small, yet allow large amounts of heat to pass through. With a gaseous system, such as that described with respect to FIGS. 1-3, to carry the increased heat, erosion of the orifice 135, and thus the torch nozzle 134 may occur. To prolong the life of the torch nozzle 134, the orifice 135 must be kept cool and resistant to heat. High heat conductivity and/or high resistance to arc erosion may be met by fabricating the erosion resistant torch 102, and more particularly the structure that defines the torch nozzle 134 out of at least one of several bulk materials including tungsten, carbon, rhenium, copper, iridium, a refractory material, an alloy of a refractory material including tungsten, carbon, rhenium, copper, iridium, or a ceramic material such as silicon carbide, aluminum oxide, etc.

In the embodiment illustrated in FIG. 2, copper is used to fabricate the torch nozzle 134, and more particularly the structure defining the torch nozzle 134. To achieve an optimum combination of high gas flow, high heat transfer and high deposition accuracy, in an alternative embodiment a combination of any of the above listed bulk materials may be used to form the structure of the torch nozzle 134. An erosion resistant material 140 is deposited on an interior of the torch nozzle 134. The erosion resistant material 140 provides for a highly erosion resistant and temperature resistant, but still highly conductive torch nozzle 134. The erosion resistant material 140 is comprised of a material having a higher melting point than that of the bulk material forming the torch nozzle 134. In this particular embodiment, the erosion resistant material 140 is formed as an erosion resistant coating layer 141 disposed on a surface of the torch nozzle 134, between the torch nozzle 134 and the arc electrode 130.

The erosion resistant material 140, and in this particular embodiment, the erosion resistant coating layer 141 is comprised of at least one of a refractory material and/or a ceramic material. Refractory materials generally consist of single or mixed high melting point oxides of elements such as rhenium, silicon, aluminum, magnesium, calcium and zirconium. Nonoxide refractory materials also exist and include materials such as carbides, nitrides, borides and graphite. Ceramic materials may include silicon carbide, aluminum oxide, or the like. In the embodiment illustrated in FIG. 2, the erosion resistant coating layer 141 is comprised of rhenium disposed on a copper substrate that forms the structure of the torch nozzle 134. This combination of materials may provide not only high bulk thermal conductivity but a more resistant erosion surface at a nozzle-gas interface 142. In an alternative embodiment, an intermediate bonding material, such as nickel or cobalt, may be included between the erosion resistant coating layer 141 and the torch nozzle 134 to improve adhesion between the highly conductive bulk materials that form the structure of the torch nozzle 134 and the erosion resistant coating layer 141.

Other alternative embodiments may include a rhenium-tungsten, molybdenum rhenium, other rhenium alloys forming the erosion resistant material 140, or an iridium material forming the erosion resistant material 140 with or without rhenium etc. as an under layer. In addition, the intermediate bonding material may be formed of a material that is soluble in both rhenium alloy and copper disposed over a copper substrate that forms the structure of the torch nozzle 134. In still further embodiments, carbon may be used as the structural substrate material that forms the torch nozzle 134 in that it is a high temperature, high conductivity material. Alternatively, the carbon may be coated with a single layer or multiple layers of an intermediate bonding material to enhance the composite properties. The disclosed combination of materials and multiple layers provides for the erosion resistant properties of the torch nozzle 102, and more particularly the orifice 135.

To fabricate the torch nozzle 134 the erosion resistant coating layer 141 or multiple layers of erosion resistant material 140 may be applied using chemical vapor deposition, physical vapor deposition, laser coating, electrochemical deposition, powder metallurgy techniques such as HIPing or axial loading, IFF, or any other deposition method commonly known in the art.

Referring now to FIG. 3, illustrated is another embodiment of the erosion resistant torch of FIG. 1, generally referenced 202. Similar to the previous embodiment an arc electrode 230 is positioned near a torch nozzle 234 and inside a gas flow channel 232. The arc electrode 230 operates to ionize a gas and create a hot argon plasma in region 236 before the gas exits the torch nozzle 234. The ionized argon plasma may be sheathed or protected by a curtain of helium, another noble gas, or other inert gases flowing from the torch nozzle 234 from a coaxial channel 238. As previously described, upon being energized, the argon gas rapidly accelerates from the torch nozzle 234 toward the workpiece 110. The torch nozzle 234 includes an orifice 235 that must be kept cool and resistant to heat. High heat conductivity and/or high resistance to arc erosion may be met by fabricating the erosion resistant torch 202, and more particularly the structure that defines the torch nozzle 234 out of at least one of several bulk materials as previously described with respect to the first embodiment.

In the embodiment illustrated in FIG. 3, copper is used to fabricate the torch nozzle 234, and more particularly the structure defining the torch nozzle 234, having defined therein the orifice 235. As previously stated, a combination of any of the above listed bulk materials may be used to form the structure of the torch nozzle 234. An erosion resistant material 240, in the form of an erosion resistant insert 242 is disposed between the torch nozzle 234 and the arc electrode 230. The erosion resistant insert 242 provides for a highly erosion resistant and temperature resistant, but still highly conductive torch nozzle 234.

Similar to the erosion resistant coating layer 141 of FIG. 2, the erosion resistant insert 242 is comprised of at least one of a refractory material and/or a ceramic material. In the embodiment illustrated in FIG. 3, the erosion resistant insert 242 is comprised of rhenium. The erosion resistant insert 242 is disposed adjacent the copper substrate that forms the structure of the torch nozzle 234. This combination of materials may provide not only high bulk thermal conductivity but a more resistant erosion surface at a nozzle-gas interface 244. In an alternative embodiment, an intermediate bonding material, such as nickel or cobalt, may be included between the erosion resistant insert 242 and the torch nozzle 234 to improve adhesion between the highly conductive bulk materials that form the structure of the torch nozzle 234 and the erosion resistant insert 242.

Other alternative embodiments may include forming the erosion resistant insert 242 of other erosion resistant materials as previous described and may include any number of intermediate bonding layers disposed between the structure forming the torch nozzle 234 and the erosion resistant insert 242. In addition, the erosion resistant insert 242 may be formed to include at least a portion that is inserted within the sidewalls that form the torch nozzle 234.

To fabricate the torch nozzle 234, the erosion resistant insert 242 is typically separately formed and disposed within the structure forming the torch nozzle 234. Any intermediate layers disposed between the erosion resistant insert 242 and the torch nozzle 234 may be applied prior to positioning the erosion resistant insert 242 using chemical vapor deposition, physical vapor deposition, laser coating, electro-chemical deposition, powder metallurgy techniques such as HIPing or axial loading, IFF, or any other deposition method commonly known in the art.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An erosion resistant torch for use in a solid free form fabrication system for manufacturing a component from successive layers of metal feedstock material, the erosion resistant torch comprising:
    a torch structure including an outer wall and a torch nozzle, the torch nozzle comprised of copper and having an exterior surface and an interior surface, the exterior surface and the outer wall defining a coaxial channel, the interior surface defining a gas flow channel and an orifice, the orifice having an inner diameter less than an inner diameter of the gas flow channel and the coaxial channel, and at least a portion of the coaxial channel surrounding the gas flow channel;
    an arc electrode disposed within the gas flow channel and configured to emit energy via the orifice as a high velocity constricted energy stream; and
    rhenium disposed on at least a portion of the interior surface of the torch nozzle.

2. The erosion resistant torch of claim 1, wherein the rhenium is a coating layer disposed on the interior surface of the torch nozzle.

3. The erosion resistant torch of claim 1, wherein the rhenium is a coating layer disposed on an intermediate bonding layer, the intermediate bonding layer disposed on the interior surface of the torch nozzle.

4. The erosion resistant torch of claim 1, wherein the rhenium is an insert positioned within the orifice defined in the torch nozzle.

5. An erosion resistant torch for use in an ion fusion fabrication system for manufacturing a component from successive layers of metal feedstock material, the erosion resistant torch comprising:
    a torch structure including an outer wall and a torch nozzle, the torch nozzle comprised of copper and having an exterior surface and an interior surface, the exterior surface and the outer wall defining a coaxial channel, the interior surface defining a gas flow channel and an orifice, the orifice having an inner diameter less than an inner diameter of the gas flow channel and the coaxial channel, and at least a portion of the coaxial channel surrounding the gas flow channel;

an arc electrode disposed within the gas flow channel and configured to emit energy via the orifice as a high velocity constricted energy stream;

rhenium disposed on at least a portion of the interior surface of the torch nozzle; and a bonding material disposed between the rhenium and the torch nozzle to bond the rhenium to the torch nozzle.

6. The erosion resistant torch of claim 5, wherein the rhenium is a coating disposed on the bonding material, the bonding material disposed as a coating on the interior surface of the torch nozzle.

7. The erosion resistant torch of claim 5, wherein the rhenium is an insert positioned within the orifice defined in the torch nozzle.

8. A solid free form fabrication system for manufacturing a component from successive layers of a metal feedstock material, the system comprising:

an erosion resistant torch positioned to emit an energy stream in an energy path;

a feedstock feed mechanism operable to feed the metal feedstock material into the energy path and deposit the metal feedstock material into a predetermined region to form the successive layers of the metal feedstock material;

a positioning arm coupled to the energy stream and the feedstock feed mechanism to form a deposition head, whereby the positioning arm is positionable to align the deposition head with a targeted region to fabricate a three-dimensional structure by transferring the metal feedstock material from the feedstock feed mechanism to the targeted region in a controlled manner by melting the metal feedstock material at a deposition point and allowing it to re-solidify at the targeted region; and a control platform coupled to the positioning arm, the control platform including a plurality of control components, whereby a plurality of customizable control parameters are input into the plurality of control components and provide positioning and repositioning of the positioning arm and operation of the deposition head;

wherein the erosion resistant torch comprises:

a torch structure including an outer wall and a torch nozzle, the torch nozzle comprised of copper and having an exterior surface and an interior surface, the exterior surface and the outer wall defining a coaxial channel, the interior surface defining a gas flow channel and an orifice, the orifice having an inner diameter less than an inner diameter of the gas flow channel and the coaxial channel, and at least a portion of the coaxial channel surrounding the gas flow channel;

an arc electrode disposed within the gas flow channel and configured to emit energy via the orifice as a high velocity constricted energy stream; and rhenium disposed on at least a portion of the interior surface of the torch nozzle.

* * * * *